United States Patent

Dobbins et al.

[11] 3,978,260
[45] Aug. 31, 1976

[54] SUBSTANTIALLY CURL-FREE SEMI-RIGID SUPPORT MEMBER FOR FOOD PACKAGES

[75] Inventors: Thomas Edward Dobbins, Neenah; William Duane Hanson; Ronald Eugene Wenzel, both of Appleton, all of Wis.

[73] Assignee: American Can Company, Greenwich, Conn.

[22] Filed: July 10, 1975

[21] Appl. No.: 594,815

[52] U.S. Cl. .............................. 428/204; 426/121; 426/124; 428/205; 428/332; 206/45.14; 206/45.33
[51] Int. Cl.² ........................................ B32B 3/00
[58] Field of Search ............ 428/204, 205; 427/210, 427/209; 426/127, 124, 129, 121; 206/45.14, 45.33

[56] References Cited
UNITED STATES PATENTS

| | | | |
|---|---|---|---|
| 1,969,569 | 8/1934 | Malocsay | 427/210 |
| 2,229,741 | 1/1941 | Hinz | 427/209 |
| 3,074,798 | 1/1963 | Palmer | 426/124 |
| 3,083,107 | 3/1963 | Tindall | 426/121 X |
| 3,196,031 | 7/1965 | Unmuth | 428/204 |
| 3,402,062 | 9/1968 | Mohan | 427/209 |
| 3,402,063 | 9/1968 | Mohan | 427/209 |
| 3,667,983 | 6/1972 | Haggas et al. | 428/205 |
| 3,803,332 | 4/1974 | Seiferth | 426/121 |

Primary Examiner—Steven L. Weinstein
Attorney, Agent, or Firm—Robert P. Auber; Frank S. Charlton; Ira S. Dorman

[57] ABSTRACT

A support member, for inclusion inside a film-wrapped package of moist and greasy food, comprising a semi-rigid thermoplastic core member printed on both sides with opaque ink distributed in substantially equal amounts on the two sides of the core and having a transparent protective overcoating of a polyolefinic resin or a varnish superposed on the printed core layer.

3 Claims, 3 Drawing Figures

SUBSTANTIALLY CURL-FREE SEMI-RIGID SUPPORT MEMBER FOR FOOD PACKAGES

BACKGROUND OF THE INVENTION

This invention relates to food packaging components made of semi-rigid synthetic thermoplastic resins and, in greater particularity, to supporting and retaining members commonly included within plastic film wrapped packages of greasy and moist foodstuffs such as sliced bacon, ham and luncheon meats. Conventionally, consumer-sized, film wrapped packages of sliced bacon, ham slices, sliced luncheon meats and the like contain a semi-rigid supporting member or backing board on which the meat product rests within the outer film wrapper. In some cases, this interior supporting member comprises a plurality of hingedly connected panels, one or more of which may extend to partially cover the foodstuff, as is often the case in bacon packaging, or the panel assembly may be arranged to surround the food product as a band, as in the packaging of frankfurters. On the other hand, sliced ham, for example, is normally supported on a flat single panel backing board within the outer film wrapper. The constructions of this invention are equally applicable to use as interior supporting and retaining members to be incorporated within film wrapped, consumer sized units of bacon, ham, sliced luncheon meats, frankfurters and similar moist, greasy foods, whether in the form of flat, planar backing boards, as two or three panel folders or as bands. For simplicity in the following description, the invention is discussed in terms of an interior supportive packaging component of bacon packages and is referred to therein as a backing board. It is intended that this term shall include simple planar support members, two or three panel support members and bands, as mentioned above.

Sliced bacon, in particular, is commonly packed in shingled fashion on a support member or backing board of wax or polyethylene coated paperboard which is subsequently overwrapped with a transparent packaging film or placed directly in a suitable paperboard carton. The film wrapped package may be evacuated before sealing and the vacuum packed unit either marketed in the described condition or placed inside a paperboard carton for presentation to the consumer market. Paperboard, although widely accepted for this use in the industry, is strongly affected by humidity and becomes rather limp when maintained within a package having a high moisture content, as is the case with packaged bacon. The tendency of paperboard to absorb moisture also often results in a transfer of water from the packaged product to the backing board, which may occasionally leave the product short in weight and in potential violation of federal or state food regulations. Furthermore, recent regulations relating to the packaging of sliced bacon have frequently led to the cutting of apertures in the backing board for exposure of a major portion of the back side of a bacon slice to the inspection of the shopper. Such apertures have further weakened the backing board structure and made it appear excessively flimsy.

SUMMARY OF THE INVENTION

It has now been determined that the problems associated with the traditional coated paperboard supporting or backing board customarily incorporated in packages of sliced bacon or other greasy and moist foods may be alleviated by use of a composite supportive structure comprising a core layer of a moisture and grease insensitive synthetic resin sheet material, printed on both sides for reasons to be set forth hereinafter and having the printing covered with a transparent protective coating, as will be described later in detail. Preferably, the core layer is also transparent, and certain portions thereof are left unprinted to serve as transparent window areas for viewing of the packaged product by the customer.

The invention will be more completely understood from the following detailed description which is given in conjunction with the accompanying drawings wherein:

FIG. 1 is a plan view of a product supporting member or backing board in accordance with this invention for use in the packaging of sliced bacon, FIG. 2 is a perspective view of a completed package of sliced bacon, and FIG. 3 is a cross-sectional view, greatly enlarged, taken along line 3—3 of FIG. 1 of a preferred embodiment of the backing board of this invention.

DESCRIPTION OF A PREFERRED EMBODIMENT OF THE INVENTION

Figure 1:
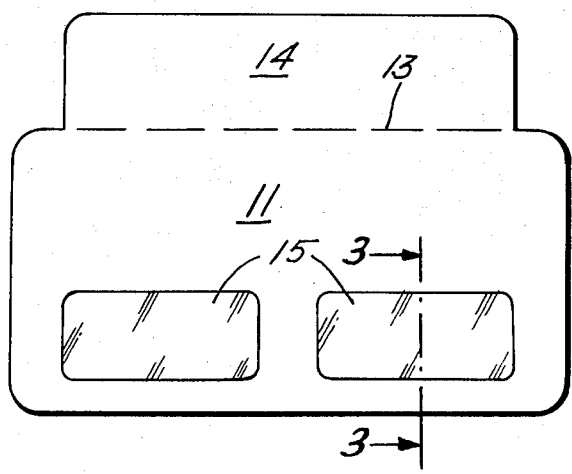
Figure 2:
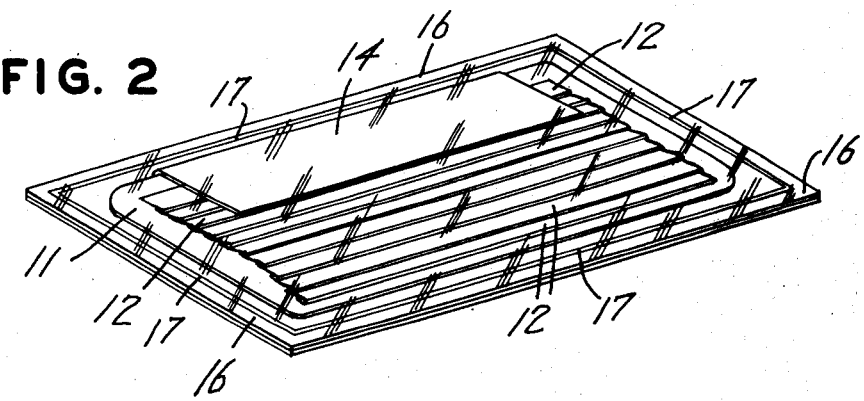

As shown in the drawings, the support member or backing board, as applied to the packaging of bacon, comprises a main support panel 11 of sufficient size to provide support or backing for the desired weight or number of pieces of sliced bacon, 12, arranged in conventional shingled fashion on the inner surface of the main support panel 11. Hingedly connected to panel 11 along weakness line 13 is a partial cover panel 14 which, in the finished package, is folded along weakness line 13 to overlie the uppermost slice of bacon, thus protecting it from light and serving also to convey printed information, such as the bacon brand name, quantity, ingredient statement and the like, to the retail customer.

The main support panel 11 preferably includes a transparent window or windows 15, through which the underside of a portion of the bacon may be viewed from the back side of the package.

In forming a package of bacon, the slices are laid in shingled array on the support panel 11, the partial cover panel 14 is folded to overlie the upper slice of bacon, the entire backing board and bacon assembly is encased in plastic film 16, evacuated and sealed around the margin thereof as at 17. The vacuum packaged bacon is then ready for marketing. It is to be understood that the packaging of bacon is described for exemplary purposes only, and the invention is applicable to packaging of other moist and greasy foods such as ham and luncheon meats.

Figure 3:
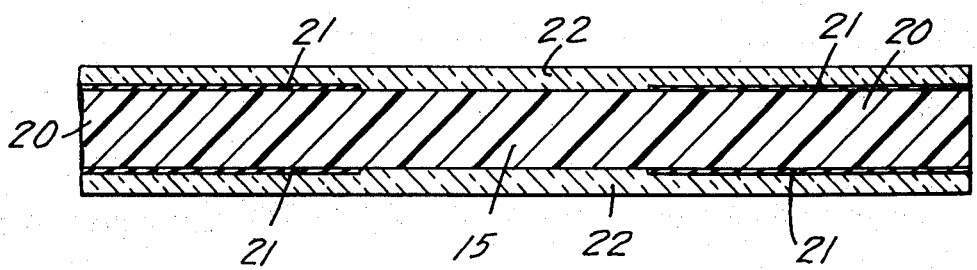

As illustrated in FIG. 3, the preferred support member or backing board is of a composite structure, having a central or core layer 20 of a transparent thermoplastic polymeric material insensitive to grease and moisture, which is printed on each side with an ink coverage 21 which is complete except in the window area 15, this area being left free of ink to provide a clear view of any product which may be packaged on the backing board. Covering the entire printed backing board surface including the window area 22 on both sides thereof are coatings 22 of a protective nature, such as polyethylene or a varnish.

In a preferred embodiment of this invention, the core layer 20 of the backing board is formed of biaxially oriented or high impact polystyrene of from about 5 to about 10 mils in thickness. Rubber modified polystyrene such as polystyrene produced with 2–6% of added polybutadiene is particularly adapted to this use because of its inertness to moisture and grease, its high degree of stiffness which is evidenced even in relatively thin webs thereof, its excellent contact clarity and finally, its ready acceptance of standard printing inks, applied by any of the customary precision printing methods. The core layer may be printed on flexographic, rotogravure or lithographic printing equipment, for example, using inks known to be satisfactory for printing on polystyrene. The printing operation is critical to the successful utilization of the backing board of this invention, however, since it has been found that, if the central core layer of the structure is printed on one side in conventional manner, the backing board will develop a substantial degree of "curl" which makes it impossible to handle the individual boards on high speed packaging machinery. By the term "curl" is meant the divergence of the board from a strictly planar state so that it assumes an arcuate configuration equivalent to a portion of the side wall of a hollow tube or cylinder.

The tendency for curl to develop in a printed sheet of polystyrene is in proportion to the percentage of the surface which is covered by a layer of ink and is also influenced by the thickness of the ink lay applied to the sheet. In the packaging of bacon, it is generally desired that the portion of the bacon which is not required to be exposed by virtue of Federal packaging regulations should be protected from the deleterious effect of light which impinges on the package while in the merchandiser's showcase. For this and for aesthetic reasons, a large portion of the backing board surface is covered with a heavy layer of ink in order that the board be opaque, leaving unprinted only the transparent window area which is desired for product visibility.

It has now been found that the tendency of the printed polystyrene core layer to develop curl may be eliminated by dividing the total amount of ink which is required for decorating and opacifying the overall backing board area into two approximately equal portions, one of which is applied to the exterior surface of the core sheet and the other to the inner surface of such sheet by any of the conventional printing processes or combination thereof.

Without being limited as to theory, it is believed that, as the dried ink film forms on the printed surface by evaporation of the volatile ink components, the film gradually shrinks and sets up tensions on the surface of the base sheet which tend to bend the sheet to be concave toward the printed side. If, however, substantially equal amounts of ink are applied to both sides of the core layer sheet, curling is substantially or completely eliminated and the final backing sheet is completely planar and may be successfully handled on the conventional high speed bacon packaging machinery.

It is theorized that the application of equal amounts of ink to both sides of the sheet results in an equalization of the surface stresses set up by the drying inks, whereby a planar printed sheet results. A further benefit is also achieved by the two-side printing of the backing board in that the creation of double the usual printed surface area and consequent reductions in the ink thickness in any given area results in more rapid and thorough drying of the inks by evaporative removal of the volatile components thereof.

The overall weight of ink, as measured by the weight of the non-volatile components thereof remaining after evaporation of the solvent components from a printed surface, should not vary more than about 25% between the two sides of the core layer. Within this range, the ink distribution is considered to be substantially equal in terms of this invention and the degree of curl imparted to the backing board by the printed layers is negligible so that the backing boards perform satisfactorily in high speed packaging operations.

Balancing of the printing ink coverage between the two sides of the sheet may be accomplished in various ways. In the preferred operations, the printing is carried out on an 8-deck rotogravure printing press having three or four of the decks capable of reverse printing. In a single pass through such a press, each side of the polystyrene core web may be given an overall coating (except for the area to be left transparent as an inspection window) of an opacifying ink such as an opaque white ink, then each side may receive an overall coating of the base color desired, after which the desired designs, instructions or other indicia, including the Universal Product Code, may be printed in one or two colors on the outer or display surface of the polystyrene sheet. Since the overall area covered by the printed indicia generally represents only a small portion of the total board area, this printing does not usually cause undue imbalance in the overall ink coverage applied to the two sides of the sheet. If noticeable imbalance does occur, however, it is usually possible to counterbalance it by a slightly heavier ink application in the opacifying or base color layers applied to the reverse side of the sheet. Following the application of all of the six coatings mentioned above, the remaining two decks of the press may be used to apply either a protective lacquer or varnish to each side of the sheet or to apply to each side of the sheet a thin coating of a primer or anchor coating conventionally utilized on a base sheet before extrusion coating the sheet with a thermoplastic, synthetic resin such as low density polyethylene, as will be described hereinafter.

If desired, the printing of the two sides of the sheet may be carried out on separate presses, which may be of the same or different types. For example, one side may be printed on rotogravure equipment and the other, in a separate operation, may be printed with a lithographic press.

The printed layer on each side of the central core layer must be covered by a protective coating in order to impart scuff and rub resistance to the printed images and to prevent the printing from coming in contact with the foodstuff packaged within the container. If desired, the protective coating layers may contain slip agents or anti-static compounds to improve handling characteristics. The protective coating may be a layer of low density polyethylene of 0.5 to about 1.5 mils thickness applied by extrusion lamination, for example, over the ink layer on each side of the backing board, or may be a coating of a lacquer or varnish such as a nitrocellulose lacquer, a polyamide type varnish, a phenolic alkyd linseed varnish or similar coating of equivalent protective properties, which is suitably applied in line on the printing press or may be applied later in a separate coating operation. In general, low density polyethylene applied in an extrusion lamination procedure gives rise to the preferred construction because of its overall protective and functional properties, but somewhat greater economy may be achieved by substitution of a lacquer or varnish coating on either one or both sides of the backing board.

In the preferred embodiment of the invention wherein the base or core layer comprises rubber modified polystyrene, the protective surface layers of polyethylene or ethylene copolymer also serve to improve the functional and handling characteristics of the polystyrene core layer during the die-cuttng and folding operations necessary for converting the backing board web stock into the individual backing boards used in the commercial packaging of a product such as sliced bacon. Polystyrene is a relatively stiff and rigid plastic, while polyethylene and its copolymers such as the ethylene-vinyl acetate copolymers and ionomers such as the ionized copolymers of ethylene and methacrylic acid are more flexible and tough. Thus, when polystyrene is die cut by standard procedures into backing board blanks, for example, the edges of the blanks may show slivers and evidence of minute shattering due to the brittleness of the polymer. Coating the surfaces of polystyrene with a more flexible and tough polymer such as polyethylene or one of the derivatives mentioned above alleviates the slivering problem and enables production of backing boards having smooth, cleanly cut edges which are readily handled by high-speed packaging machinery and which have no slivers or other debris from the die cutting operation which could contaminate the product being packaged or puncture the overwrap film.

Furthermore, the usual backing board utilized for packaging sliced bacon includes a weakness line 13 such as a line of perforations to enable a top flap portion 14 to be folded over to overlie a portion of the upper surface of the packaged product. Polystyrene is relatively brittle and has a tendency to crack when folded along such line of weakness, whereas polystyrene based backing boards having a coating on each side thereof of low density polyethylene or its equivalent may be folded along the weakened line without danger of cracking and severance of the top flap portion from the main body of the backing board.

In another embodiment of the supportive packaging component construction of this invention, the core layer may comprise high density polyethylene, polypropylene, a blend of olefin polymers or an olefinic copolymer of 5–10 mils thickness, coated on both sides with ink films and printed in the manner previously described and having the printing protected by thin coatings of a varnish or extrusion-laminated low density polyethylene, a polyethylene ionomer or an ethylene-vinyl acetate copolymer. The extrusion-laminated polyethylene (or derivative thereof) applied as the surface layers of this embodiment may be quite thin, 0.5 to 1.0 mil on each side being sufficient to adequately protect the printed matter on the core. If polystyrene or rubber modified high impact polystyrene is used as the base or core layer, it is preferred that the extrusion-laminated outer layers of ethylene polymer or copolymer range in thickness between about 1.0 and 2.0 mils. Thicker coatings, including coatings of thicknesses as high as 3 mils or more may be used, of course, but are unnecessary and therefore are economically unjustified.

We claim:

1. A multi-layered, semi-rigid, substantially curl-free package component of composite structure adapted to support and retain a moist and greasy food product within a sealed transparent package, said supporting and retaining package component comprising an inner core layer of between about 5 and about 10 mils in thickness comprising transparent, high impact polystyrene, a coating layer of opaque printing ink covering the entire surface of each side of said core layer except for an unprinted area, the unprinted areas being substantially equal and in general registry with one another to provide an inspection window, each said surface having a substantially equal weight of said printing ink thereon, a protective overcoating layer of a transparent coating material covering at least the printed areas on both sides of said core layer, said overcoating layer on each side of said core being between 0.5 and 2.0 mils in thickness and each of said overcoating layers being selected from the group consisting of low density polyethylene, copolymers of ethylene and vinyl acetate, polyethylene ionomers, nitrocellulose lacquer, polyamide based varnish and phenolic alkyd linseed varnish.

2. A package component in accordance with claim 1 wherein at least one of said overcoating layers in low density polyethylene.

3. A package component in accordance with claim 1 wherein the protective overcoating is low density polyethylene between about 1.0 and 2.0 mils in thickness covering the entire surface of each side of the backing board.

* * * * *